April 26, 1960 J. A. ALESI 2,933,763
PLASTIC METERING AND DISPENSING APPARATUS
Filed March 31, 1958 2 Sheets-Sheet 1

INVENTOR.
JOHN A. ALESI
BY
Attorneys

April 26, 1960 J. A. ALESI 2,933,763
PLASTIC METERING AND DISPENSING APPARATUS
Filed March 31, 1958 2 Sheets-Sheet 2
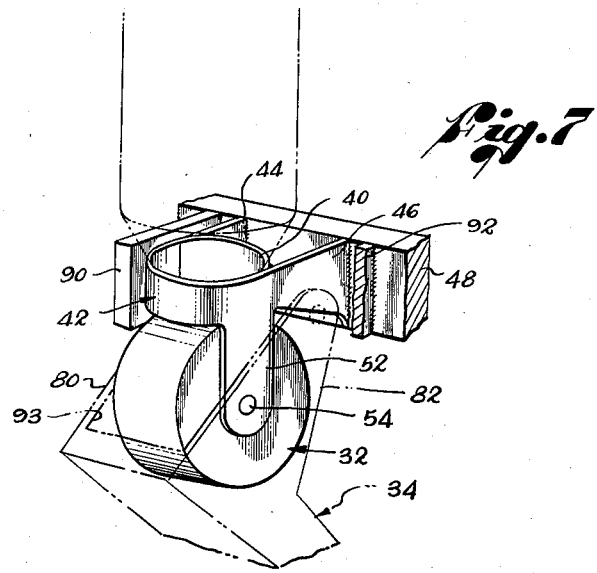
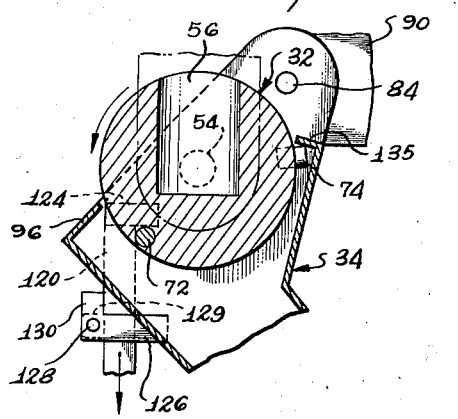
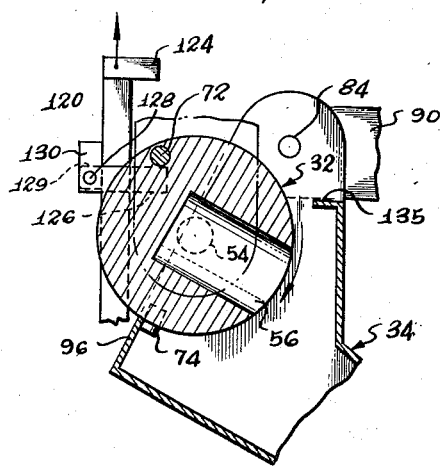
INVENTOR.
JOHN A. ALESI
BY *Fulwider Mattingly & Huntley*
Attorneys United States Patent Office 2,933,763
Patented Apr. 26, 1960

2,933,763
PLASTIC METERING AND DISPENSING APPARATUS

John A. Alesi, Los Angeles, Calif.

Application March 31, 1958, Serial No. 725,266

9 Claims. (Cl. 18—30)

The present invention relates generally to molding machines and more particularly to a novel and improved device for metering and dispensing powdered plastic material into the mold cavity of a molding machine.

It is a major object of the present invention to provide a novel and improved apparatus for metering and dispensing powdered plastic materials into the mold cavity of a compression molding machine.

A further object of the invention is to provide apparatus of the aforedescribed nature which is simple of design having but a relatively few working parts whereby it may undergo long periods of operation without requiring any attention from an operator other than refilling its hopper with powdered plastic.

Another object of the invention is to provide apparatus of the aforedescribed nature which accurately dispenses a metered amount of plastic material during each working stroke of the compression molding machine.

A further object of the invention is to provide a metering and dispensing apparatus of the aforedescribed nature which is extremely easy to adjust as to the quantity of material being dispensed, such adjustment being capable of accomplishment in a minimum amount of time without special tools.

An additional object is to provide metering and dispensing apparatus of the aforedescribed nature which is entirely automatic in operation and does not require an operator possessing any special training.

Yet another object of the invention is to provide plastic metering and dispensing apparatus of the aforedescribed nature which may be utilized with conventional compression molding machines without requiring other than minor modifications thereto.

Yet a further object of the present invention is to provide plastic metering and dispensing apparatus which may be constructed at comparatively low cost as compared to existing devices of this nature.

It is an important object of the present invention to provide plastic metering and dispensing apparatus of the aforedescribed nature which will positively direct each charge of plastic material within the confines of the mold cavity.

These and other objects and advantages of the present invention will become apparent from the following detailed description, when taken in conjunction with the appended drawings wherein:

Figure 7 is a fragmentary enlarged perspective view showing the mounting of said charging cylinder; and Figures 8 and 9 are diagrammatic views showing the mode of operation of said apparatus during a plastic dispensing operation.

Figure 1:
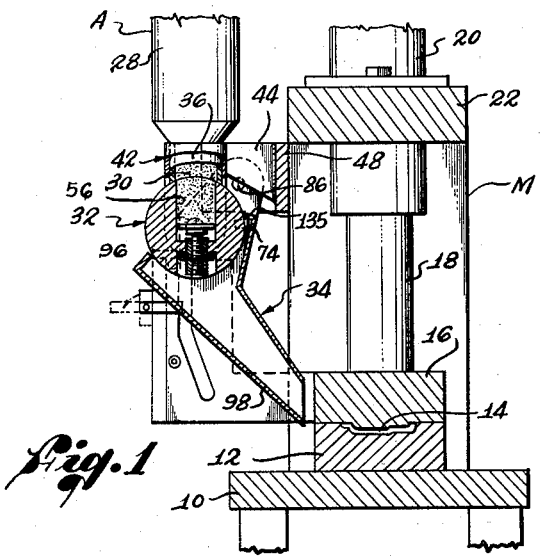
Figure 1 is a side elevational view of a preferred form of plastic metering and dispensing apparatus embodying the present invention.

Referring to the drawings the preferred form of plastic metering and dispensing apparatus A embodying the present invention is adapted to be employed with a conventional compression molding machine M. The compression molding machine M includes a base 10 upon which is mounted a female mold 12 that is formed with a mold cavity 14. A male die carrier 16 is disposed above the mold 12 for vertical reciprocation relative thereto. The male die carrier 16 is affixed to the lower end of a ram or plunger 18 with the latter being telescopically slidably arranged within a hydraulic or pneumatic cylinder 20 so as to be vertically reciprocated in a well-known manner. The lower portion of the cylinder 20 is affixed to a horizontally extending crossbar 22 which is rigidly connected to the base 10 by a pair of upstanding columns 24 and 26. The preferred form of plastic metering and dispensing apparatus A embodying the present invention includes a hopper, generally designated 28, which contains powdered plastic material 30. A charging cylinder, generally designated 32, is adapted to receive powdered plastic material 30 from the hopper 28 when it is disposed in its position of Figure 1. When the male die carrier 16 has been moved to its raised position of Figure 2, the powdered plastic material within the charging cylinder 32 is transferred to the mold cavity 14 by means of a feed chute, generally designated 34.

More particularly, the major portion of the hopper 28 is generally cylindrical with its lower portion being of downwardly tapered frusto-conical configuration that terminates in a tubular neck 36. This neck 36 is telescopically supported within a cylindrical socket formed at the upper portion of a charging cylinder support member, generally designated 42. As shown particularly in Figure 7, the charging cylinder support member 42 includes a pair of horizontally extending arms 44 and 46 having their front ends rigidly affixed to a horizontal bar 48. As shown clearly in Figures 1 and 4, the outer ends of the bar 48 are rigidly affixed to the rear of the base columns 24 and 26 as by bolts 49. The charging cylinder support mounting member 42 is also formed with a pair of depending arms 52. The lower portion of these arms receive a pin 54 that rotatably supports the charging cylinder 32.

Figure 4:
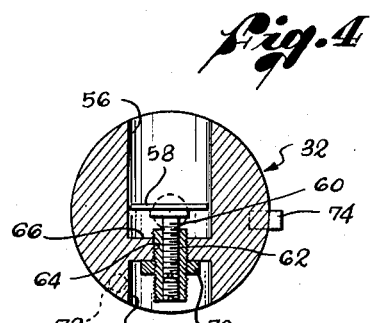
Figure 4 is an enlarged vertical sectional view of a charging cylinder member of said apparatus.

With particular reference to Figure 4, the charging cylinder 32 is formed with a radially extending cylindrical dispensing cavity 56 that receives the powdered plastic material 30 from hopper 28. The exact quantity of powdered plastic material 30 transferred by the charging cylinder 32 to the feed chute 34 during a single metering operation is controlled by a proportioning disc 58 arranged transversely within the dispensing cavity 56 and having an outer diameter only slightly smaller than the diameter of the cavity. This proportioning disc 58 is rigidly affixed to the upper end of a threaded adjustment post 60 with the latter being supported within an internally threaded mounting sleeve 62. The mounting sleeve 62 is externally threaded so as to be supported within an internally threaded bore 64 coaxial with and extending radially away from the inner end 66 of the dispensing cavity 56. The lower portion of this sleeve 62 extends into a second cylindrical cavity 68 formed in the lower portion of a charging cylinder 32 coaxial with the dispensing cavity 56. A lock nut 70 is provided for the lower portion of the sleeve 62. The charging cylinder 32 is also provided at one side with a pin 72 and a stop element 74 formed on the periphery of the charging cylinder. The purpose of these elements will be fully set forth hereinafter.

The side walls 79 of the feed chute 34 are formed at their upper portion with a pair of aligned mounting ears 80 and 82. The upper portion of these mounting ears are formed with a pair of aligned bores 84 through which extends a horizontal pivot pin 86. The ends of the pivot pin 86 are carried between a pair of rearwardly extending arms 90 and 92; the front ends of these arms being rigidly affixed to the aforedescribed support bar 48. The upper rear portion of the feed chute 34 is formed with an opening 93 that receives the charging cylinder 32. The lower portion of this opening 93 is defined by a lip 96. The lower edge of this lip 96 intersects the downwardly and forwardly sloping bottom wall 98 of the chute. The front end of the chute is formed with a discharge opening 104. It should be noted that one of the side walls 79 is formed with a horizontally extending cam follower pin 106.

Figure 3:
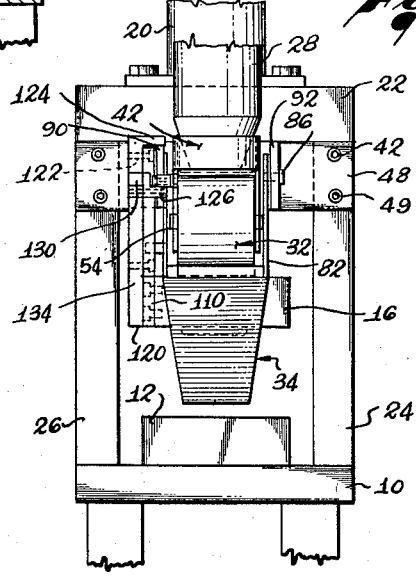
Figure 3 is a rear elevational view of said apparatus.
Figure 5:
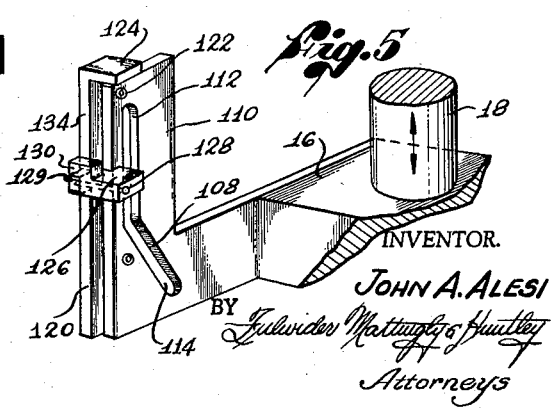
Figure 5 is a fragmentary enlarged perspective view showing a detail of said apparatus.

Referring now particularly to Figure 5, the aforementioned cam follower pin 106 of the feed chute 34 is slidably disposed within a cam slot 108 formed in a vertically extending bracket 110 of generally L-shaped configuration. The front portion of the bracket 110 is rigidly affixed to one side of the male die carrier 16 so as to undergo vertical reciprocation concurrently therewith. The cam slot 108 includes a vertically extending upper portion 112 and a contiguous downwardly and forwardly extending lower portion 114. With this arrangement, the feed chute 34 will be pivoted counter-clockwise from its original rearwardly-disposed position of Figure 1 to its forwardly-disposed position of Figure 3 each time the male die carrier 16 is raised to its elevated position of the latter figure.

Figure 6:
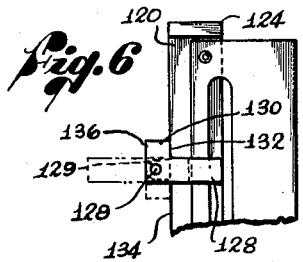
Figure 6 is a fragmentary enlarged side elevational view showing a second detail of said apparatus.

With reference now to Figures 5 and 6, the rear portion of the bracket 110 is rigidly affixed to a vertically extending trip finger support post 120 by bolts 122. The upper end of this post 120 is integrally formed with a fixed trip finger 124. The intermediate portion of this post 120 supports a second trip finger 126 by means of a pivot pin 128 extending through an ear 129. The lower trip finger 126 is normally arranged in its horizontally extending operative position shown in Figure 5 and in solid outline in Figure 6. It is retained in this operative position by means of an integral upstanding abutment element 130, the front surface 132 of this abutment element being engaged with the rear surface 134 of the post 120 above ear 129. The lower trip finger 126 may, however, be pivoted in a counter-clockwise direction to its dotted outline position of Figure 6. At this time, the abutment element surface 136 opposite surface 132 will engage the rear surface 134 of the post 120 so as to retain the finger in such second position.

It should be noted that the fixed trip finger 124 is at all times in vertical alignment with the pin 72 formed on one side of the charging cylinder 32. The lower trip finger 126 will be in vertical alignment with the pin 72 only when it is disposed in its operative position. When the lower trip finger 128 is rotated to its dotted outline position of Figure 6, it will be vertically misaligned with the pin 72 and may be considered inoperative.

In the operation of the aforedescribed preferred form of metering and dispensing apparatus, the proportioning disc 58 is first adjusted relative to the dispensing cavity 56 so as to meter the desired amount of powdered plastic material 30 to be transferred to the mold cavity 14 during each operating cycle of the molding machine M. Such adjustment may be accomplished by rotating the adjustment post 60 within its sleeve 62 so as to move the proportioning disc 58 towards or away from the open end of the dispensing cavity. Alternately, the sleeve 62 may be screwed or unscrewed relative to the threaded bore 64 so as to effect such movement of the proportioning disc. It may sometimes be necessary to adjust both the post 60 as well as the sleeve 62 in order to obtain the desired positioning of the proportioning disc 58. This adjustment may be conveniently performed with the charging cylinder 32 arranged in its position of Figure 2.

Thereafter, and with particular reference to Figures 8 and 9, the hopper 28 may be filled with powdered plastic material 30. This material 30 will enter the open end of the dispensing cavity 56 when the apparatus is arranged in its position of Figures 1 and 9. At this time it will be observed that the male die carrier 16 is disposed in its lowermost or molding position. When the male die carrier 16 is raised to its elevated position of Figure 2, assuming the lower trip finger 128 is disposed in its operative position of Figure 5, this trip finger will engage the pin 72 on the side of the charging cylinder 32, as shown in Figure 8, so as to effect clockwise rotation of the charging cylinder to its dispensing position shown in Figure 2. This clockwise rotation of the charging cylinder will be limited by the abutment of its stop element 74 with the upper edge of the lip 96 of the feed chute 34. The contents of the dispensing cavity 56 will in this manner be dumped into the feed chute 34. This powdered plastic material will flow downwardly through the feed chute 34 into the confines of the mold cavity 14. It should be particularly noted that during upward movement of the male die carrier 16, the cam follower pin 106 formed on the side of the feed chute 34 will follow the contour of the cam slot 108 so as to cause the feed chute to be pivoted forwardly to its advanced position of Figure 2 thereby placing its discharge opening 104 directly over the mold cavity 14.

Figure 2:
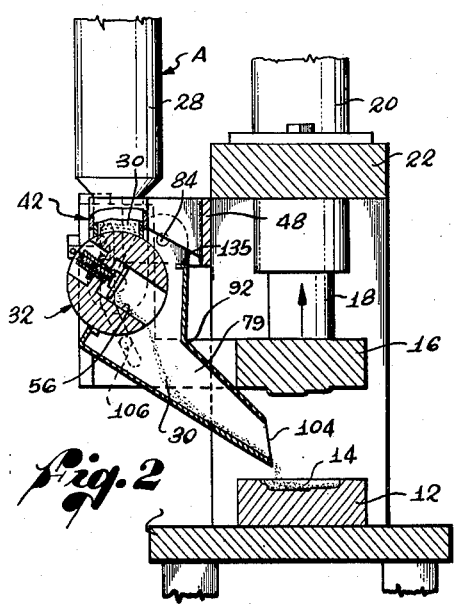
Figure 2 is a view similar to Figure 1 but showing the parts of said apparatus in a plastic dispensing position.

As the male die carrier 16 is again lowered towards its molding position of Figure 1, the fixed trip finger 124 will engage the pin 72 of the charging cylinder 32 so as to effect its counter-clockwise rotation to its original plastic-receiving position of Figure 1, as shown particularly in Figure 1. Such counter-clockwise rotation will be limited by the abutment of the stop element 74 with a protuberance 135 formed on the upper interior portion of the feed chute 34. Simultaneously, the cam follower pin 106 of the feed chute 34 will follow the contour of the cam slot 108 so as to cause the feed chute to be retracted to its original position.

It is a particular feature of the present invention that the lower trip finger 128 may be readily pivoted to its inoperative position shown in dotted outline in Figure 6 so as to be moved out of vertical alignment with the charging cylinder pin 72. With the trip finger 128 disposed in its inoperative position, upward movement of the male die carrier 16 will not cause the charging cylinder 32 to undergo rotation out of its charge-receiving position. Accordingly, it is possible to effect vertical reciprocation of the male die carrier without having the powdered plastic material 30 dispensed through the feed chute 34. When it again becomes desirable for molding operations to take place, the lower trip finger 128 may be easily returned to its operative position.

While there has been shown and described hereinbefore what is presently considered to be the preferred embodiment of the present invention, it will be apparent that various modifications and changes may be made thereto without departing from the spirit of the invention or the scope of the following claims.

I claim:

1. Moldable material metering and dispensing apparatus for use with a molding machine having a frame, a mold cavity formed on said frame and a vertically reciprocable male die carrier, comprising: a hopper for said material secured to said frame; a charging cylinder formed with a dispensing cavity in communication with said hopper, said cylinder being rotatably supported relative to said frame; means for transferring said material from said dispensing cavity to said mold cavity; a fixed trip finger supported by said male die carrier to engage said cylinder and rotate it to a material-receiving position when said male die carrier is lowered relative to said mold cavity; and a second trip finger supported by said male die carrier in either an operative position wherein it engages said cylinder so as to rotate it to a material dispensing position when said male die carrier is raised relative to said mold cavity, or alternately in an inoperative position wherein it does not effect rotation of said cylinder when said male die carrier is raised relative to said mold cavity.

2. Moldable material metering and dispensing apparatus for use with a molding machine having a frame, a mold cavity formed on said frame and a vertically reciprocable male die carrier, comprising: a hopper for said material secured to said frame; a charging cylinder formed with a dispensing cavity adapted to receive said material from said hopper, said cylinder being rotatably supported relative to said frame; a proportioning disc disposed in said cavity; adjustment means interconnecting said disc and said cylinder to control the position of said disc within said dispensing cavity and thereby meter the quantity of said material being dispensed by said cylinder; means for transferring said material from said dispensing cavity to said mold cavity; a fixed trip finger supported by said male die carrier to engage said cylinder and rotate it to a material-receiving position when said male die carrier is lowered relative to said mold cavity; and a second trip finger supported by said male die carrier in either an operative position wherein it engages said cylinder so as to rotate it to a material-dispensing position when said male die carrier is raised relative to said mold cavity, or alternately in an inoperative position wherein it does not effect rotation of said cylinder when said male die carrier is raised relative to said mold cavity.

3. Moldable material metering and dispensing apparatus for use with a molding machine having a frame, a mold cavity formed on said frame and a vertically reciprocable male die carrier, comprising: a hopper for said material secured to said frame; a charging cylinder formed with a dispensing cavity adapted to receive said material from said hopper, said cylinder being rotatably supported relative to said frame; a feed chute for transferring material from said dispensing cavity to said mold cavity; means supporting said chute on said frame for movement between a retracted position wherein its discharge end is displaced to one side of said mold cavity and a second position wherein its discharge end is disposed above said mold cavity; means interposed between said male die carrier and said chute for camming said chute between its retracted and second positions during vertical reciprocation of said male die carrier; a trip finger support carried by said male die carrier; a fixed trip finger on said support and engageable with said cylinder so as to rotate it to a material-receiving position when said male die carrier is lowered relative to said mold cavity; and a second trip finger on said support, said second trip finger being disposable in either an operative position wherein it engages said cylinder so as to rotate it to a material-dispensing position when said male die carrier is raised relative to said mold cavity, or alternately in an inoperative position wherein it does not effect rotation of said cylinder when said male die carrier is raised relative to said mold cavity.

4. Moldable material metering and dispensing apparatus for use with a molding machine having a frame, a mold cavity formed on said frame and a vertically reciprocable male die carrier, comprising: a hopper for said material secured to said frame; a charging cylinder formed with a dispensing cavity adapted to receive said material from said hopper, said cylinder being rotatably supported relative to said frame; a proportioning disc disposed transversely in said cavity; adjustment means interconnecting said disc and said cylinder to control the position of said disc within said dispensing cavity and thereby meter the quantity of said material being dispensed by said cylinder; a feed chute for transferring material from said dispensing cavity to said mold cavity; means supporting said chute on said frame for movement between a retracted position wherein its discharge end is displaced to one side of said mold cavity and a second position wherein its discharge end is disposed above said mold cavity; means interposed between said male die carrier and said chute for camming said chute between its retracted and second positions during vertical reciprocation of said male die carrier; a fixed trip finger supported by said male die carrier to engage said cylinder and rotate it to a material-receiving position when said male die carrier is lowered relative to said mold cavity; and a second trip finger supported by said male die carrier in either an operative position wherein it engages said cylinder so as to rotate it to a material-dispensing position when said male die carrier is raised relative to said mold cavity, or alternately in an inoperative position wherein it does not effect rotation of said cylinder when said male die carrier is raised relative to said mold cavity.

5. Moldable material metering and dispensing apparatus for use with a molding machine having a frame, a mold cavity formed on said frame and a vertically reciprocable male die carrier, comprising: a hopper for said material secured to said frame; a charging cylinder formed with a dispensing cavity adapted to receive said material from said hopper, said cylinder being rotatably supported relative to said frame; a proportioning disc disposed transversely in said cavity; adjustment means interconnecting said disc and said cylinder to control the position of said disc within said dispensing cavity and thereby meter the quantity of said material being dispensed by said cylinder; a feed chute for transferring material from said dispensing cavity to said mold cavity; means supporting said chute on said frame for movement between a retracted position wherein its discharge end is displaced to one side of said mold cavity and a second position wherein its discharge end is disposed above said mold cavity; means interposed between said male die carrier and said chute for camming said chute between its retracted and second positions during vertical reciprocation of said male die carrier; a trip finger support carried by said male die carrier; a fixed trip finger on said support and engageable with said cylinder so as to rotate it to a material-receiving position when said male die carrier is lowered relative to said mold cavity; and a second trip finger on said support, said second trip finger being disposable in either an operative position wherein it engages said cylinder so as to rotate it to a material-dispensing position when said male die carrier is raised relative to said mold cavity, or alternately in an inoperative position wherein it does not effect rotation of said cylinder when said male die carrier is raised relative to said mold cavity.

6. Moldable material metering and dispensing apparatus for use with a molding machine having a frame, a mold cavity formed on said frame and a vertically reciprocable male die carrier, comprising: a hopper for said material secured to said frame; a charging cylinder formed with a dispensing cavity adapted to receive said material from said hopper, said cylinder being rotatably supported relative to said frame; a pin formed on one side of said cylinder; means for transferring said material from said dispensing cavity to said mold cavity; a trip finger support carried by said male die carrier; a fixed trip finger on said support spaced above in vertical alignment with and engageable with said pin so as to rotate said cylinder to a material-receiving position when said male die carrier is lowered relative to said mold cavity; and a second trip finger on said support spaced below said pin, said second trip finger being disposable in either an operative position wherein it engages said pin so as to rotate said cylinder to its material-dispensing position when said male die carrier is raised relative to said mold cavity, or alternately in an inoperative position wherein it is out of vertical alignment wth said pin.

7. Moldable material metering and dispensing apparatus for use with a molding machine having a frame, a mold cavity formed on said frame and a vertically reciprocable male die carrier, comprising: a hopper for said material secured to said frame; a charging cylinder formed with a dispensing cavity adapted to receive said material from said hopper, said cylinder being rotatably supported relative to said frame; a pin formed on one side of said cylinder; a proportioning disc disposed in said cavity; adjustment means interconnecting said disc and said cylinder to control the position of said disc within said dispensing cavity and thereby meter the quantity of said material being dispensed by said cylinder; means for transferring said material from said dispensing cavity to said mold cavity; a trip finger support carried by said male die carrier; a fixed trip finger on said support spaced above in vertical alignment with and engageable with said pin so as to rotate said cylinder to a material-receiving position when said male die carrier is lowered relatve to said mold cavity; and a second trip finger on said support spaced below said pin, said second trip finger being disposable in either an operative position wherein it engages said pin so as to rotate said cylinder to its material-dispensing position when said male die carrrier is raised relative to said mold cavity, or alternately in an inoperative position wherein it is out of vertical alignment with said pin.

8. Moldable material metering and dispensing apparatus for use with a molding machine having a frame, a mold cavity formed on said frame and a vertically reciprocable male die carrier, comprising: a hopper for said material secured to said frame; a charging cylinder formed with a dispensing cavity adapted to receive said material from said hopper, said cylinder being rotatably supported relative to said frame; a pin formed on said cylinder; a feed chute for transferring material from said dispensing cavity to said mold cavity; means supporting said chute on said frame for movement between a retracted position wherein its discharge end is displaced to one side of said mold cavity and a second position wherein its discharge end is disposed above said mold cavity; means interposed between said male die carrier and said chute for camming said chute between its retracted and second positions during vertical reciprocation of said male die carrier; a trip finger support carried by said male die carrier; a fixed trip finger on said support spaced above in vertical alignment with and engageable with said pin so as to rotate said cylinder to a material-receiving position when said male die carrier is lowered relative to said mold cavity; and a second trip finger on said support spaced below said pin, said second trip finger being disposable in either an operative position wherein it engages said pin so as to rotate said cylinder to its material-dispensing position when said male die carrier is raised relative to said mold cavity, or alternately in an inoperative position wherein it is out of vertical alignment with said pin.

9. Moldable material metering and dispensing apparatus for use with a molding machine having a frame, a mold cavity formed on said frame and a vertical reciprocable male die carrier, comprising: a hopper for said material secured to said frame; a charging cylinder formed with a dispensing cavity adapted to receive said material from said hopper, said cylinder being rotatably supported relative to said frame; a pin formed on said cylinder; a proportioning disc disposed transversely in said cavity; adjustment means interconnecting said disc and said cylinder to control the position of said disc within said dispensing cavity and thereby meter the quantity of said material being dispensed by said cylinder; a feed chute for transferring material from said dispensing cavity to said mold cavity; means supporting said chute on said frame for movement between a retracted position wherein its discharge end is displaced to one side of said mold cavity and a second position wherein its discharge end is disposed above said mold cavity; means interposed between said male die carrier and said chute for camming said chute between its retracted and second positions during vertical reciprocation of said male die carrier; a trip finger support carried by said male die carrier; a fixed trip finger on said support spaced above in vertical alignment with and engageable with said pin so as to rotate said cylinder to a material-receiving position when said male die carrier is lowered relative to said mold cavity; and a second trip finger on said support spaced below said pin, said second trip finger being disposable in either an operative position wherein it engages said pin so as to rotate said cylinder to its material-dispensing position when said male die carrier is raised relative to said mold cavity, or alternately in an inoperative position wherein it is out of vertical alignment with said pin.

References Cited in the file of this patent
UNITED STATES PATENTS

| | | |
|---|---|---|
| 2,242,189 | Zelov et al. | May 13, 1941 |
| 2,781,546 | Hallenbeck et al. | Feb. 19, 1957 |

FOREIGN PATENTS

| | | |
|---|---|---|
| 694,264 | Great Britain | July 15, 1953 |